US009575760B2

(12) United States Patent
Kini et al.

(10) Patent No.: US 9,575,760 B2
(45) Date of Patent: Feb. 21, 2017

(54) TECHNIQUES FOR SHARING PRIORITIES BETWEEN STREAMS OF WORK AND DYNAMIC PARALLELISM

(71) Applicant: NVIDIA CORPORATION, Santa Clara, CA (US)

(72) Inventors: Vivek Kini, Sunnyvale, CA (US); Christopher Lamb, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 46 days.

(21) Appl. No.: 13/897,123

(22) Filed: May 17, 2013

(65) Prior Publication Data

US 2014/0344821 A1    Nov. 20, 2014

(51) Int. Cl.
G06F 9/38     (2006.01)
G06F 9/48     (2006.01)
G06F 9/50     (2006.01)
G06T 1/20     (2006.01)

(52) U.S. Cl.
CPC .............. *G06F 9/38* (2013.01); *G06F 9/4881* (2013.01); *G06F 9/5038* (2013.01); *G06F 9/4843* (2013.01); *G06F 2209/5021* (2013.01); *G06T 1/20* (2013.01)

(58) Field of Classification Search
None
See application file for complete search history.

(56) References Cited

U.S. PATENT DOCUMENTS

| 5,845,116 A * | 12/1998 | Saito ..................... G06F 9/4862 718/103 |
| 6,389,449 B1 * | 5/2002 | Nemirovsky ....... G06F 9/30123 712/228 |
| 2005/0149933 A1 * | 7/2005 | Saito et al. ................... 718/100 |
| 2013/0305258 A1 * | 11/2013 | Durant .......................... 718/106 |

* cited by examiner

Primary Examiner — Qing Wu
(74) Attorney, Agent, or Firm — Artegis Law Group, LLP (57) ABSTRACT

One embodiment sets forth a method for assigning priorities to kernels launched by a software application and executed within a stream of work on a parallel processing subsystem that supports dynamic parallelism. First, the software application assigns a maximum nesting depth for dynamic parallelism. The software application then assigns a stream priority to a stream. These assignments cause a driver to map the stream priority to a device priority and, subsequently, associate the device priority with the stream. As part of the mapping, the driver ensures that each device priority is at least the maximum nesting depth higher than the device priorities associated with any lower priority streams. Subsequently, the driver launches any kernel included in the stream with the device priority associated with the stream. Advantageously, by strategically assigning the maximum nesting depth and prioritizing streams, an application developer may increase the overall processing efficiency of the software application.

24 Claims, 6 Drawing Sheets

TECHNIQUES FOR SHARING PRIORITIES BETWEEN STREAMS OF WORK AND DYNAMIC PARALLELISM

BACKGROUND OF THE INVENTION

Field of the Invention

Embodiments of the present invention generally relate to general purpose computing and, more specifically, to techniques for sharing priorities between streams of work and dynamic parallelism.

Description of the Related Art

A typical parallel processing subsystem, that may include one or more graphics processing units (GPUs), is capable of very high performance using a relatively large number of small, parallel execution threads on dedicated programmable hardware processing units. The specialized design of such parallel processing subsystems usually allows these subsystems to efficiently perform certain tasks, such as rendering 3-D scenes or computing the product of two matrices, using a high volume of concurrent computational and memory operations.

To fully realize the processing capabilities of advanced parallel processing subsystems, subsystem functionality may be exposed to application developers through one or more application programming interfaces (APIs) of calls and libraries. Among other things, doing so enables application developers to tailor a software application executing on a central processing unit (CPU) to optimize the way parallel processing subsystems function. In one approach to developing a software application, the software application developer may divide work included in the software application into streams of work components (e.g., computational and memory operations). Each stream may be executed concurrently on the parallel processing subsystem. More specifically, work components included in different streams may run concurrently and may be interleaved. In contrast, within each stream, a sequence of work components executes in issue-order on the parallel processing subsystem.

The parallel processing subsystem may schedule the execution of the work components using a variety of techniques depending on the functionality included in the parallel processing subsystem. Two features that may be included in advanced parallel processing systems are support for prioritizing work components and preemption of currently executing computation work components. For example, a parallel processing subsystem that supports prioritization may be configured to schedule work components in priority-order. And a preemption-capable parallel processing subsystem may be configured to preempt a lower-priority computational work component executing on a parallel processing subsystem resource in favor of a higher-priority computational work component.

Typically, a parallel processing subsystem that includes prioritization functionality supports a limited set of priorities—referred to herein as a "set of valid device priorities." In one approach to exposing prioritization capabilities, an API included in a software stack enables the software application to assign a desired stream priority to a stream. An API driver (also included in the software stack) then maps the desired stream priority to a device priority included in the set of valid device priorities. Further, the API driver may store the device priority in a memory resource associated with the stream. Subsequently, if the software application requests the launch of a work component within the stream, then the API driver may request that the parallel processing subsystem launch the work component with the device priority associated with the stream.

Advanced parallel processing subsystems may also support dynamic parallelism. Dynamic parallelism allows a "parent" work component executing on the parallel processing subsystem to launch a "child" work component on the parallel processing subsystem. The parallel processing subsystem may also enable to "parent" work component to optionally synchronize on the completion of the "child" work component. Further, the parallel processing subsystem may enable the "parent" work component to consume the output produced from the "child" work component. In some implementations, the parallel processing subsystem performs the launching, synchronization, and consumption of the results of a "child" work component without involving the CPU.

Some parallel processing subsystems support multiple levels of nested "child" launches, where each subordinate launch executes at a new level. In other words, the "parent" work component executing at a first level may launch a first "child" work component. The first "child" work component executing at a second level may then launch a second "child" work component. The second "child" work component executing at a third level may then launch a third "child" work component, and so on. Because of resource limitations, such as the memory required by the parallel processing system to support each new level, the parallel processing subsystem will typically define a max nesting depth (N). Notably, the max nesting depth N is the maximum number of work components in the chain (and, therefore the maximum number of levels). For example, if a "parent" work component launches a first "child" work component and then the "first" child work component launches a "second" work component, then the nesting depth would be three (N=3). Any launch of a work component which would result in a "child" kernel executing at a deeper level than the maximum nesting depth will fail.

Dynamic parallelism usually requires that a "parent" work component is able to synchronize on any "child" work components that the "parent" work component launches. However, if executing the "parent" work component were to completely occupy the parallel processing subsystem resources, then the "child" work component would be unable to execute. Consequently, the "parent" work component would be unable to synchronize on the "child" work component. To avoid synchronization problems, the parallel processing subsystem is typically configured to ensure that the "child" work component receives enough resources to fully execute. In particular, the parallel processing subsystem is typically configured to give preference to the "child" work component whenever there is a resource contention between the "child" work component and the "parent" work component.

To ensure preferential treatment for the "child" work component, the parallel processing subsystem typically uses on or more of the valid device priorities mentioned above. More specifically, the parallel processing subsystem assigns a "child" work component a device priority that is one higher than the "parent" work component. Because each "child" work component may also launch nested "child" work components, to support a max nesting depth of N, the parallel processing subsystem requires (N−1) valid device priorities for child work components.

In one approach to accommodating dynamic parallelism in conjunction with prioritizing streams, the API driver reserves (N−1) valid device priorities to support a fixed maximum nesting depth of N. Further, the API driver is configured to disregard the device priority associated with a stream when launching a "parent" work component within the stream. In particular, upon receiving a request to launch a "parent" work component, the API driver launches the "parent" work component at the lowest valid device priority.

One drawback to this approach to prioritizing work is that by reserving (N-1) valid device priorities, the number of valid device priorities available for prioritizing streams is reduced by (N-1). And reducing the number of device priorities available for prioritizing streams may reduce the ability of application developers to optimize the performance of software applications. For example, to tune a software algorithm that performs video decoding and encoding using a pipelined workflow with M stages, an application developer could strategically allocate the work components for each stage into M prioritized streams. More specifically, to reduce the likelihood that a particular frame is starved for resources by subsequent frames, the second stage could be prioritized higher than the first stage, the third stage could be prioritized higher than the second stage, and so on. If a parallel processing subsystem were to support less than M device priorities for prioritizing streams, then the parallel processing subsystem would be unable to fully support the stream prioritization requests included in the software application. Consequently, the overall latency of each frame could be increased and, therefore, could be more likely to cause jitter in frame rates than in a parallel processing subsystem that supported M device priorities for streams.

Another drawback to the above approach to prioritizing work is that indiscriminately launching all "parent" work components at the default device priority could adversely affect latency-sensitive work components included in a high priority stream. For instance, suppose that a stream "StreamA" associated with a high device priority were to include a work component "ChildlessA" and a work component "ParentA." Further, suppose that the work component "ParentA" were configured to launch a "child" work component "ChildA." Finally, suppose that the work component "ChildlessA" were not configured to launch any "child" work components. The API driver would launch the work component "ChildlessA" at the high device priority associated with the stream and the work component "ParentA" at the lowest device priority. Subsequently, the parallel processing subsystem would launch the "ChildA" work component at a device priority reserved for "child" priorities (i.e., one higher than the lowest device priority). Consequently, if "ParentA" were a highly latency-sensitive work component, then executing "ParentA" at the lowest device priority could increase latency and reduce the execution speed of the software application.

As the foregoing illustrates, what is needed in the art is a more effective way to prioritize work submitted to parallel processing subsystems that support dynamic parallelism.

SUMMARY OF THE INVENTION

One embodiment of the present invention sets forth a method for mapping a plurality of stream priorities associated with a software application to a plurality of device priorities supported by a parallel processing subsystem. The method includes identifying a maximum nesting depth; receiving a first request from the software application to associate a first stream with a first stream priority; mapping the first stream priority to a first device priority; receiving a second request from the software application to associate a second stream with a second stream priority, where the second stream priority is higher in priority than the first stream priority; and mapping the second stream priority to a second device priority, where the second device priority is at least the maximum nesting depth higher in priority than the first device priority.

Other embodiments of the present invention include, without limitation, a computer-readable storage medium including instructions that, when executed by a processing unit, cause the processing unit to implement aspects of the techniques described herein as well as a system that includes different elements configured to implement aspects of the techniques described herein.

By implementing the disclosed techniques, together the API and the driver enable software applications to affect the number of priority levels available for streams. Strategically setting the number of priority levels allows the driver to more effective prioritize work components submitted to parallel processing subsystems that support dynamic parallelism. Consequently, the performance of the software applications may be improved by decreasing latency and increasing throughput.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

Figure 1:
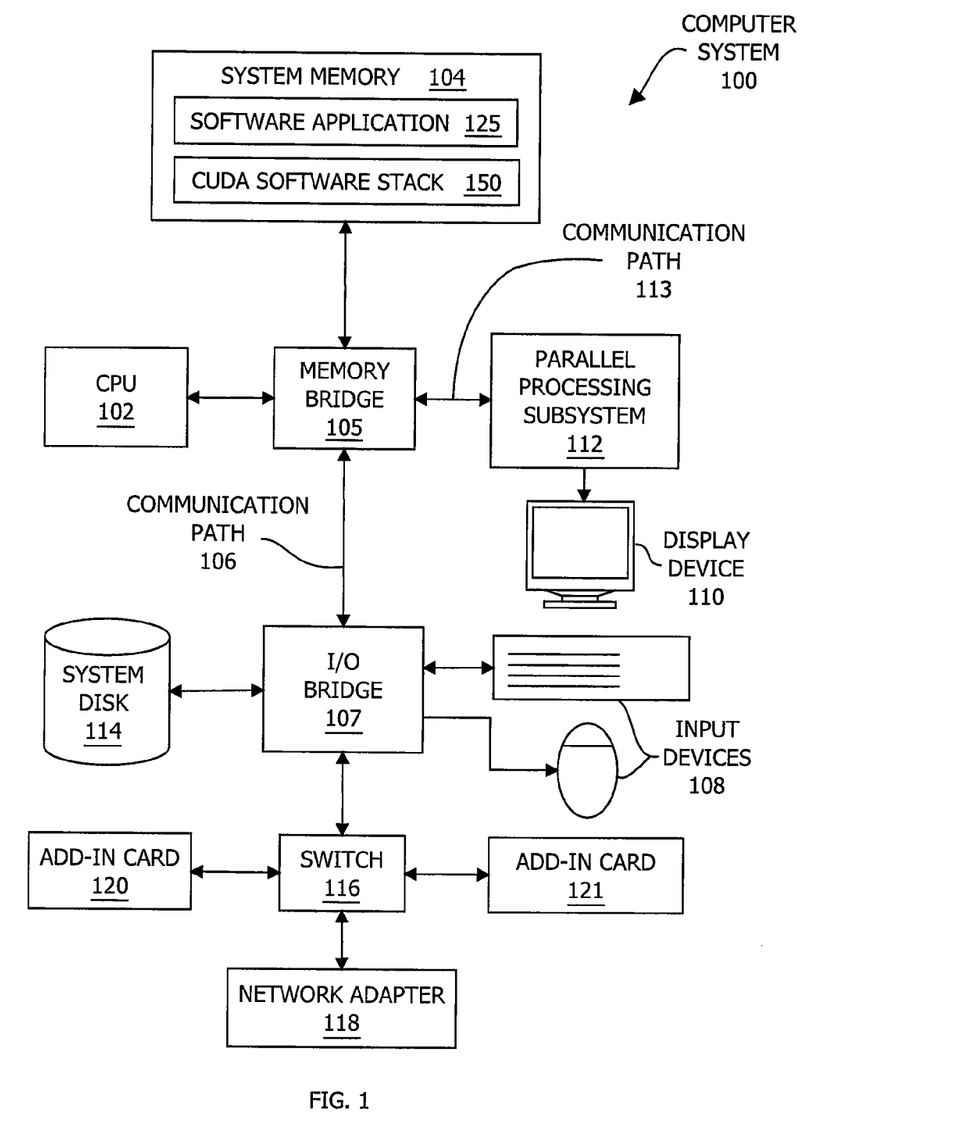
FIG. 1 is a block diagram illustrating a computer system configured to implement one or more aspects of the present invention.

FIG. 1 is a block diagram illustrating a computer system 100 configured to implement one or more aspects of the present invention. As shown, the computer system 100 includes, without limitation, a central processing unit (CPU) 102 and a system memory 104 communicating via an interconnection path that may include a memory bridge 105. Memory bridge 105, which may be, e.g., a Northbridge chip, is connected via a bus or other communication path 106

(e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 (e.g., a conventional cathode ray tube or liquid crystal display based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital video disc (DVD) drives, film recording devices, and the like, may also be connected to I/O bridge 107. The various communication paths shown in FIG. 1, including the specifically named communication paths 106 and 113, may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

In operation, the CPU 102 is the master processor of the computer system 100, controlling and coordinating operations of other system components. In particular, the CPU 102 issues commands that control the operation of the parallel processing subsystem 112. Those commands may originate within a software application 125 resident in the system memory 104 and executing on the CPU 102. A compute unified device architecture (CUDA) software stack 150 is also resident in the system memory 104. CUDA is a general-purpose computing environment which uses the parallel processing subsystem 112 to perform various computing tasks. The CUDA software stack 150 is a set of programs included in the CUDA that issue and manage general-purpose computations that operate on components in the parallel processing subsystem 112. The software application 125 may generate requests (i.e., calls) for processing by the CUDA software stack 150 to produce a desired set of results. In alternate embodiments, the CUDA software stack may be replaced with any set of software programs that expose and manage parallel processing subsystem functionality. For i, the CUDA software stack may be replaced with a different general-purpose compute software stack or a graphics software stack. Further, the CUDA software stack may be configured to inter-operate with one or more additional software stacks.

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
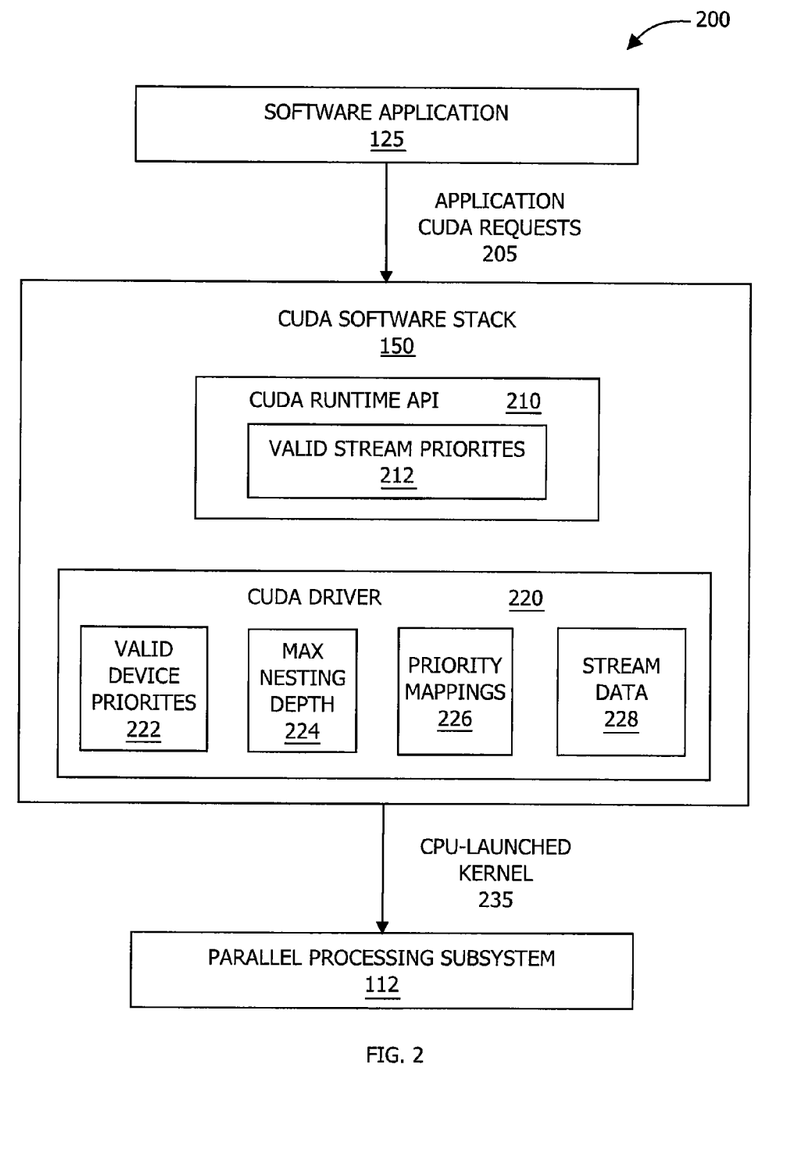
FIG. 2 is a conceptual diagram illustrating how application CUDA requests are processed within the computer system of FIG. 1, according to one embodiment of the present invention.

FIG. 2 is a conceptual diagram illustrating how application CUDA requests 205 are processed within the computer system 100 of FIG. 1, according to one embodiment of the present invention. As shown, the subsystem 200 includes, without limitation, the software application 125, the CUDA software stack 150, and the parallel processing subsystem 112 of FIG. 1.

To efficiently achieve a set of results using the parallel processing subsystem 112, the software application 125 passes application CUDA requests 205 to the CUDA software stack 150. As shown, the CUDA software stack 150 includes a CUDA runtime application programming interface (API) 210 and a CUDA driver 220. The CUDA runtime API 210 includes calls and libraries that expose the functionality of the parallel processing subsystem 112 to application developers. And the CUDA driver 220 is configured to translate the application CUDA requests 205 received by the CUDA runtime API 210 to lower-level commands that execute on components within the parallel processing subsystem 112.

More specifically, the CUDA driver 220 may submit one or more streams (not shown) to the parallel processing subsystem 112 for execution within the parallel processing subsystem 112. Each stream may include any number and combination of work components. In particular, a CUDA stream may include one or more CPU-launched kernels 235. In general, a kernel is a function that has a defined entrance and exit and, typically, performs a computation on each element of an input list. Each CPU-launched kernel 235 is invoked by code that is executed by the CPU, such as the software application 125. In contrast, a GPU-launched kernel (not shown) is invoked by code that is executed by the parallel processing subsystem 112, such as the CPU-launched kernel 235. Within each stream, the components, including the CPU-launched kernels 235, execute in issue-order on the parallel processing subsystem 112. However work components, such as CPU-launched kernels 235, included in different streams may run concurrently and may be interleaved.

The parallel processing subsystem 112 includes advanced prioritization functionality that enables prioritization of kernels and preemption of currently executing kernels. Thus, the parallel processing subsystem 112 may schedule kernels in priority-order. And the parallel processing subsystem 112 may preempt a lower-priority kernel executing on a parallel processing subsystem 112 resource in favor of one or more higher-priority kernels. For example, suppose that the parallel processing subsystem 112 were to receive a high priority kernel "KHIGH." Further, suppose that a low priority kernel "KLOW" were executing on a resource included in the parallel processing subsystem 112. The parallel processing subsystem 112 could interrupt the kernel "KLOW," execute the kernel "KHIGH" on the resource, and then resume executing the kernel "KLOW" on the resource.

Further, the parallel processing subsystem 112 is configured to support dynamic parallelism. As previously noted herein, dynamic parallelism enables a "parent" work component executing on the parallel processing subsystem 112 to launch a "child" work component on the parallel processing subsystem 112. More specifically, any number, including zero, of CPU-launched kernels 235 may be configured to launch one or more "child" CPU-launched kernels. In other words, any number of CPU-launched kernels 235 may be "parent" kernels. And any number of CPU-launched kernels 235 may be configured not to launch any kernels and, therefore, would not be "parent" kernels. Further, since CPU-launched kernels 235 are initiated by the software application 125, not by a kernel executing on the parallel processing subsystem 112, no CPU-launched kernel 235 is a "child" kernel.

As part of dynamic parallelism, the parallel processing subsystem 112 supports multiple levels of nested "child" launches, where each subordinate launch executes at a new level, and the total number of execution levels is the nesting depth. For example, suppose that the "parent" CPU-launched kernel 235 were to execute at a first level and launch a first "child" GPU-launched kernel. The first "child" GPU-launched kernel could execute at a second level and launch a second "child" GPU-launched kernel, and so on. The parallel processing subsystem 112 is configured to ensure that a "child" GPU-launched kernel is not starved for resources by the "parent" kernel (either the CPU-launched kernel 235 or another "child" GPU-launched kernel). When a "parent" kernel launches a subordinate "child" GPU-launched kernel, the parallel processing subsystem 112 assigns a higher priority to the "child" GPU-launched kernel than to the "parent" kernel. In particular, in the embodiment of FIG. 2, the parallel processing subsystem 112 is configured to assign a priority to the "child" kernel that is exactly 1 priority level higher than the priority of the "parent" kernel. In alternate embodiments, the parallel processing subsystem 112 may be configured to ensure higher priorities are assigned to "child" kernels in any technically feasible manner.

Advantageously, the CUDA software stack 150 is configured to flexibly expose both the available prioritization capability and the dynamic parallelism functionality of the parallel processing subsystem 112 to application developers. Notably, the CUDA runtime API 210 exposes these features by supporting application CUDA requests 205 to assign priorities to streams and to adjust dynamic parallelism limits. To facilitate the processing of these application CUDA requests 205, the CUDA runtime API defines a set of valid stream priorities 212. And the CUDA driver 220 includes valid device priorities 222, max nesting depth 224, priority mappings 226, and stream data 228.

The valid stream priorities 212 are defined by the CUDA runtime API and may be included in application CUDA requests 205 to prioritize streams. The valid stream priorities 212 may use higher numbers to represent higher priorities or lower numbers to represent higher priorities, and may specify any number as a default priority. For instance, the valid device stream priorities 212 could include three numbers with (1) representing the highest priority and (−1) representing the lowest priority. Similarly, the valid device priorities 222 represent priorities defined and supported by the parallel processing subsystem 112. The valid device priorities 222 may include any number, including zero, of priorities that are supported by the parallel processing subsystem 112. The valid device priorities 224 may use higher numbers to represent higher priorities or lower numbers to represent higher priorities and may specify any number as a default priority. For example, the valid device priorities 222 could include sixty-four numbers with (−63) representing the highest priority and (0) representing the lowest priority. The number of valid stream priorities 212 may be greater than, less than, or equal to the number of valid device priorities 222. Further, the number of valid device priorities 222 available for prioritizing streams is typically limited by support for dynamic parallelism. More specifically, as outlined previously herein, one or more of the valid device priorities 222 may be used by the parallel processing subsystem 112 to support dynamic parallelism.

Each execution level supported by dynamic parallelism requires additional resources, such as memory resources and valid device priorities 222. Consequently, to efficiently allocate resources, the parallel processing subsystem 112 is configured to limit nested launches to the max nesting depth 224. Notably, the parallel-processing system 112 will not initiate the launch of a GPU-launched kernel that would execute at a level lower than the max nesting depth 224. And, as persons skilled in the art will understand, as the max nesting depth 224 increases, the number of valid device priorities 222 available for prioritizing streams decreases. In particular, for each valid device priority 222 that is allocated for prioritizing streams, an additional, higher priority valid device priority 222 is also allocated for each supported nesting level. In other words, suppose that the max nesting depth were set to N and the number of available valid device priorities were M. The number of valid device priorities available for prioritizing streams would be M divided by N, rounded down to the nearest integer. Advantageously, the CUDA runtime API 210 supports application CUDA requests 205 that enable the software application 125 to set the max nesting depth 224 to reflect the requirements of the software application 125.

To enable comprehensive support for prioritizing streams in conjunction with dynamic parallelism, the CUDA driver 220 is configured map the valid stream priorities 212 to the valid device priorities 222. To facilitate this mapping, the CUDA driver 220 stores the mappings as the priority mappings 226 and data associated with streams as stream data 228. The CUDA driver 220 may store the priority mappings 226 and the stream data 228 in any available memory resource, such as the system memory 104. As part of the mapping process, the CUDA driver 220 is configured to assign priorities to different streams in a manner that optimally reflects the intention of the software-application 125. Consequently, the CUDA driver 220 uses the max nesting depth 224 to guide the mapping of the valid stream priorities 212 to the valid device priorities 222.

More specifically, the CUDA driver 220 calculates the number of valid device priorities 222 available for prioritizing streams by dividing the number of valid device priorities 222 by the max nesting depth 224 and, subsequently, rounding down to the nearest integer. The CUDA driver 220 then splits the valid device priorities 222 between valid device priorities 222 for prioritizing streams and valid device priorities 222 for "child" GPU-launched kernels. For example, suppose that the max nesting depth 224 were N. The CUDA driver 220 would ensure that for each of the valid device priorities 222 allocated for prioritizing streams, the next (N−1) higher priority valid device priorities 222 were reserved for "child" GPU-launched kernels. In general, each valid device priority 222 allocated for prioritizing streams will be at least the max nesting depth 224 higher than any lower priority valid device priority 222 allocated for prioritizing streams. If the number of valid stream priorities 212 exceeds the number of valid device priorities 222 available for prioritizing streams, then the CUDA driver 220 may assign multiple valid stream priorities 212 to the same valid device priority 222.

Embodiments of the invention disclosed herein may employ any technically feasible mapping algorithm. For instance, suppose that the valid device priorities 222 were to range from a lowest valid device priority 222 of 0 to a highest valid device priority 222 of 9. Further, suppose that the max nesting depth 224 were to be 4. Finally, suppose that the valid stream priorities 212 were to range from a lowest valid stream priority 222 of 100 to a highest valid stream priority 222 of 199. The number of device priorities 222 allocated for stream prioritization would be 2. In one embodiment, the CUDA driver 220 could map the valid stream priority 212 of 100 to the valid device priority 222 of 0, and the valid stream priorities of 101-199 to the valid device priority 222 of 4. In another embodiment, the CUDA driver 220 could map the valid stream priority of 199 to the valid device priority 222 of 6, and the valid stream priorities of 100-198 to the valid device priority 222 of 2.

Advantageously, by allocating the valid device priorities 222 based on an application-specific max nesting depth 224, the CUDA driver 220 provides a flexible framework for supporting both prioritization and dynamic parallelism. In particular, this flexible approach enables application developers to make trade-offs between prioritization and dynamic parallelism based on the needs of the software application 125. By assigning a low max nesting depth 224, the software application 125 may use more unique valid stream priorities 212 to strategically prioritize CPU-launched kernels 235. Alternatively, by assigning a high max nesting depth 224, the software application 125 may use more levels of parallelism. In this fashion, application developers may structure their applications 125 to increase performance. In contrast, in prior-art approaches to supporting both prioritization and dynamic parallelism, the allocation of the valid device priorities is fixed. Consequently, prior-art approaches may limit the ability of application developers to tune the performance of their software applications.

As disclosed previously herein, the CUDA runtime API 210 supports application CUDA requests 205 that enable the software application 125 to assign valid stream priorities 212 to streams. Upon receiving an application CUDA request 205 to assign a particular valid stream priority 212 to a stream, the CUDA driver 220 accesses the priority mappings 226. The CUDA driver uses data included in the priority mappings 226 to determine the valid device priority 222 corresponding to the particular valid stream priority 212. Subsequently, the CUDA driver 220 stores the determined valid device priority 222 along with stream-specific identifying information, such as a stream name or a stream ID, as stream data 228. In alternate embodiments, the CUDA driver 220 may be configured to perform this priority mapping on-the-fly. In other words, the CUDA driver may not be configured to pre-determine and store the priority mappings upon receiving the max nesting depth. Instead, the CUDA driver may be configured to calculate a specific priority mapping upon receiving an application CUDA request to assign a particular valid stream priority to a stream.

Upon receiving a specific application CUDA request 205 to launch a particular CPU-launched kernel 235 within a stream, the CUDA driver 220 accesses the stream data 228 to determine whether the stream is associated with one of the valid device priorities 222. If the steam is associated with one of the valid device priorities 222, then the CUDA driver 220 includes the valid device priority 222 when submitting the CPU-launched kernel 235 to the parallel processing system 112 for launch within the stream. If the stream is not associated with one of the valid device priorities 222, then the CUDA driver 220 includes a default device priority when submitting the CPU-launched kernel 235 to the parallel processing system 112 for launch within the stream. In alternate embodiments, the CUDA driver may submit the CPU-launched kernel to the parallel processing system without including any priority information.

Advantageously, if a stream is associated with a particular valid device priority 222, then the CUDA driver 220 is configured to submit all CPU-launched kernels 235 within the stream at the particular valid device priority 222. Thus, the CUDA driver 220 may submit CPU-launched kernels 235 that initiate dynamic parallelism (i.e., are configured to launch "child" GPU-launched kernels) at valid device priorities 222 other than the lowest valid device priority 222. In contrast, in prior-art approaches to prioritizing streams, CPU-launched kernels that initiate dynamic parallelism are submitted at the lowest priority included in the valid device priorities, thereby limiting the effectiveness of assigning priorities to streams.

Figure 3:
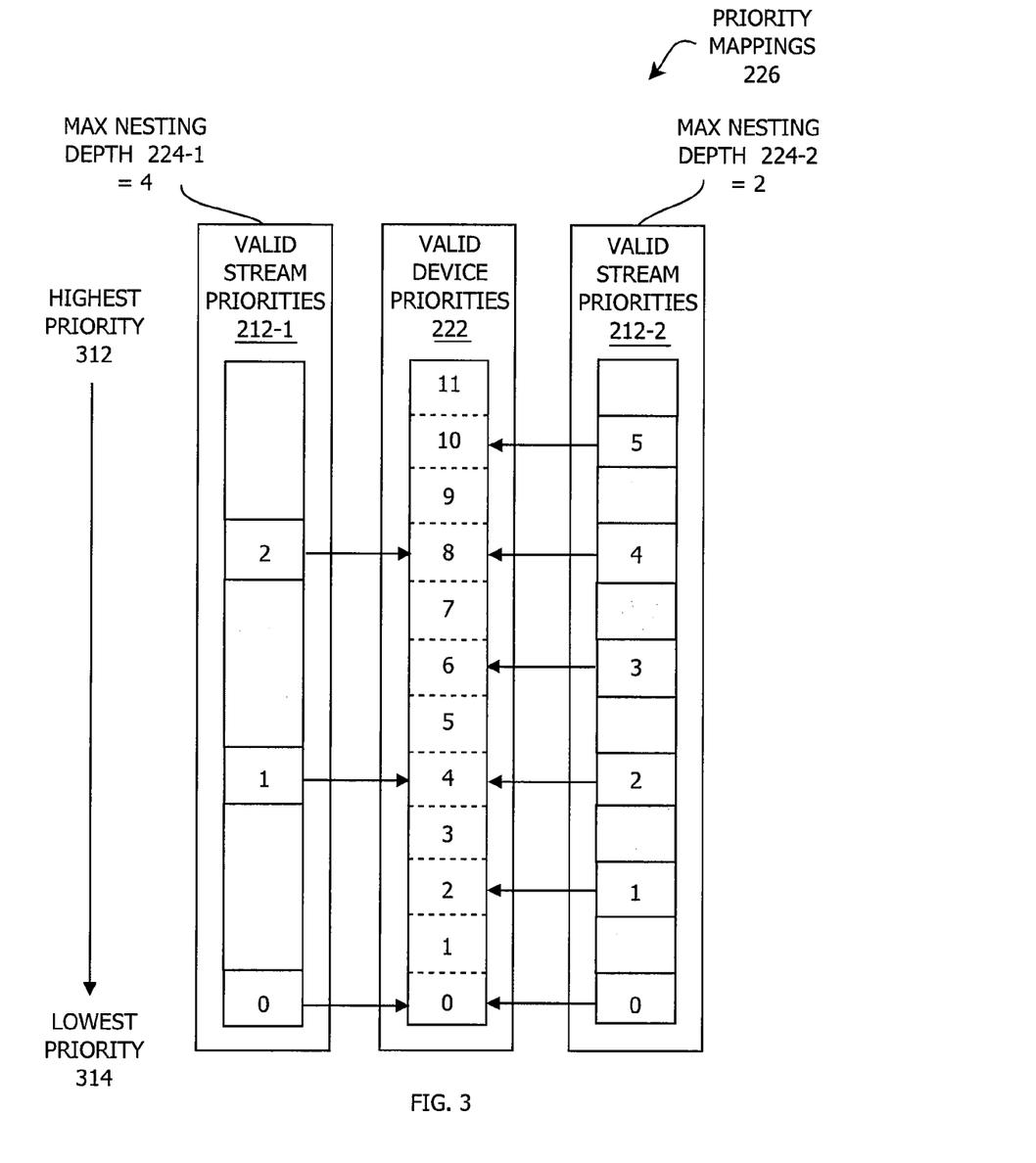
FIG. 3 is a conceptual diagram illustrating the priority mappings of FIG. 2, according to one embodiment of the present invention.

FIG. 3 is a conceptual diagram illustrating the priority mappings 226 of FIG. 2, according to one embodiment of the present invention. The computer system 100 includes two different software applications 125-1 and 125-2 (not shown). And FIG. 3 illustrates the two different priority mappings 226 corresponding to the two different software applications 125.

As shown, the two priority mappings 226 are depicted by arrows organized vertically from a highest priority 312 to a lowest priority 314. As also shown, the valid device priorities 222 defined by the parallel processing subsystem 112 include a lowest valid device priority 222 of 0 to a highest valid device priority 222 of 11. Thus, the total number of valid device priorities 222 is 12.

The first software application 125-1 includes the max nesting depth 224-1 of 4 and the valid stream priorities 212-1. To determine the number of valid device priorities 222 available for prioritizing streams, the CUDA driver 220 divides the number of valid device priorities 222 by the max nesting depth 224-1 and then rounds down to the nearest integer. Consequently, the number of valid device priorities 222 available for prioritizing streams included in the first software application 125-1 is 3. Because the max nesting depth 224-1 is 4, the CUDA driver 220 ensures that the valid device priorities 222 included in the priority mappings 226 corresponding to the valid stream priorities 212-1 are separated by at least 4 valid device priorities 222. This separation enables the parallel processing subsystem 112 to support dynamic parallelism to a nesting depth of 4 (i.e., the max nesting depth 224-1).

As shown, the valid stream priorities 212-1 include a lowest valid stream priority 212-1 of 0 to a highest valid stream priority 212-2 of 2. The priority mapping 226 corresponding to the first software application 125-1 is depicted by the arrows linking the valid stream priorities 212-1 to the valid device priorities 222. As also shown, the CUDA driver 220 maps the valid stream priority 212-1 of 0 to the valid device priority 222 of 0. The CUDA driver 220 then maps the valid stream priority 212-1 of 1 to the valid device priority 222 of 4. Finally, the CUDA driver 220 maps the valid stream priority 212-1 of 2 to the valid device priority of 8.

The second software application 125-2 includes the max nesting depth 224-2 of 2 and the valid stream priorities 212-2. As previously noted herein, the number of device priorities included in the valid device priorities 222 is 12. Consequently, the CUDA driver 220 determines that the number of valid device priorities 222 available for prioritizing streams included in the second software application 125-2 is 6 (12 divided by 2). And, to support dynamic parallelism, the CUDA driver 220 ensures that the valid device priorities 222 included in the priority mappings 226 corresponding to the valid stream priorities 212-2 are separated by at least 2 valid device priorities 222.

As shown, the valid stream priorities 212-2 include a lowest valid stream priority 212-2 of 0 to a highest valid stream priority 212-2 of 5. The priority mapping 226 corresponding to the second software application 125 is depicted by the arrows linking the valid stream priorities 212-2 to the valid device priorities 222. More specifically, as shown, the CUDA driver 220 maps the valid stream priority 212-2 of 0 to the valid device priority 222 of 0. The CUDA driver 220 then maps the valid stream priority 212-1 of 1 to the valid device priority 222 of 2, and so on.

Figure 4:
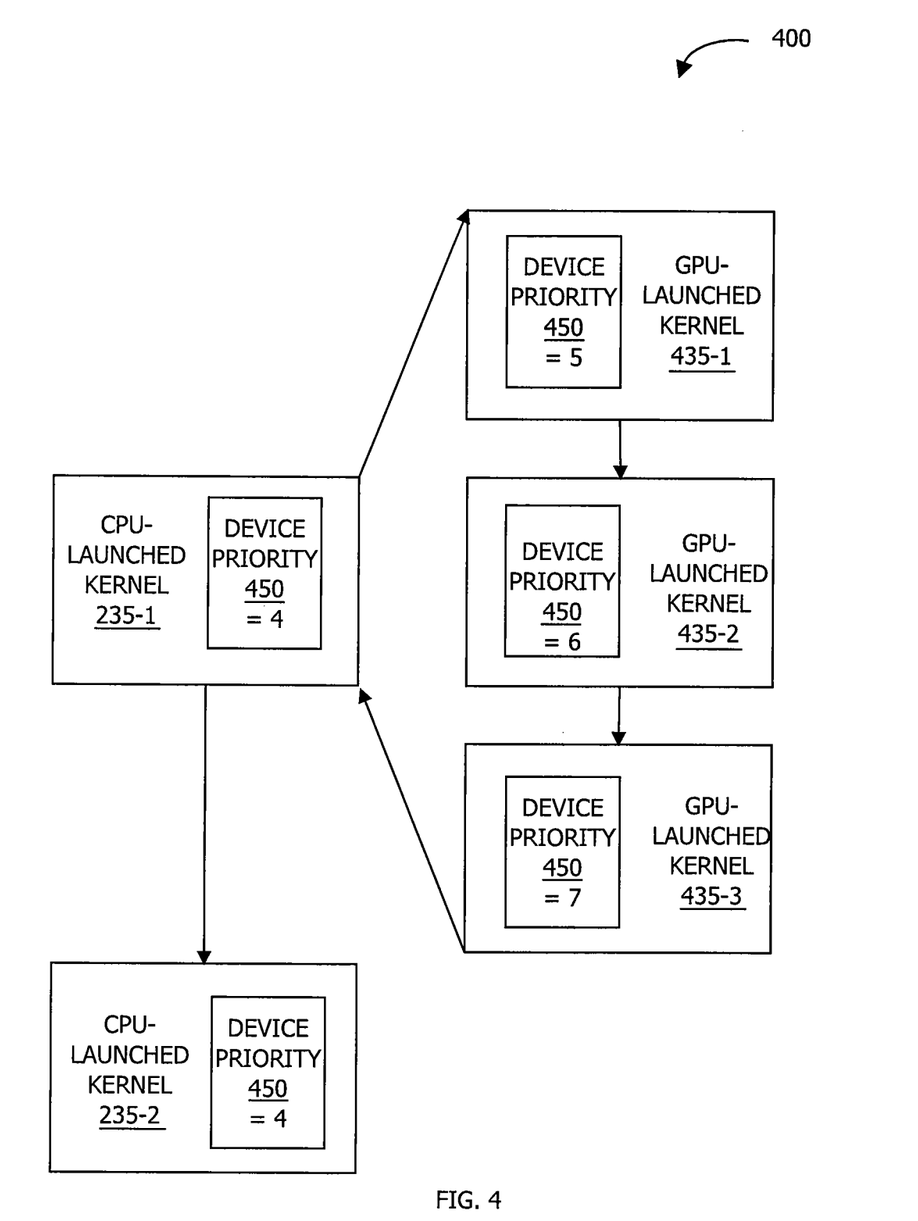
FIG. 4 is a conceptual diagram illustrating the execution order of the CPU-launched kernels of FIG. 2, according to one embodiment of the present invention.

FIG. 4 is a conceptual diagram illustrating the execution order of the CPU-launched kernels 235 of FIG. 2, according to one embodiment of the present invention. As shown, the CPU-launched kernel 235-1 includes a device priority 450 of 4. The CPU-launched kernel 235-2 is included in the same stream (not shown) as the CPU-launched kernel 235-1. Consequently, the CPU-launched kernel 235-2 also includes a device priority 450 of 4. In this embodiment of the present invention, the device priorities 450 increase as the execution priority increases (i.e., a higher device priority 450 corresponds to a higher execution priority).

As shown, the CPU-launched kernel 235-1 directs the parallel processing subsystem 112 to launch a GPU-launched kernel 435-1. Because the parallel processing subsystem 112 launches the GPU-launched kernel 435-1 as a "child" of the CPU-launched kernel 235-1, the parallel processing subsystem 112 prioritizes the GPU-launched kernel 435-1. In particular, the parallel processing subsystem 112 sets the device priority 450 included in the GPU-launched kernel 435-1 to one higher than the device priority 450 included in the CPU-launched kernel 235-1. In other words, the parallel processing subsystem 112 sets the device priority 450 included in the GPU-launched kernel 435-1 to 5. This prioritization ensures that the parallel processing subsystem 112 allocates resources towards the execution of the "child" GPU-launched kernel 435-1 in preference to the "parent" CPU launched-kernel 235-1.

While executing, the GPU-launched kernel 435-1 launches a nested GPU-launched kernel 435-2. Because the parallel processing subsystem 112 launches the GPU-launched kernel 435-2 as a "child" of the GPU-launched kernel 435-1, the parallel processing subsystem 112 prioritizes the GPU-launched kernel 435-2. More specifically, the parallel processing subsystem 112 sets the device priority 450 included in the GPU-launched kernel 435-2 to one higher than the device priority 450 included in the GPU-launched kernel 435-1. In other words, the parallel processing subsystem 112 sets the device priority 450 included in the GPU-launched kernel 435-2 to 6. This prioritization ensures that the parallel processing subsystem 112 prioritizes the "child" GPU-launched kernel 435-2 over the "parent" GPU launched-kernel 435-1.

Similarly, the GPU-launched kernel 435-2 launches a nested GPU-launched kernel 435-3. And the parallel processing subsystem 112 sets the device priority 450 included in the GPU-launched kernel 435-3 to 7. After the GPU-launched kernel 435-3 completes executing, the GPU-launched kernel 435-2 completes executing. And, after the GPU-launched kernel 435-2 completes executing, the GPU-launched kernel 435-1 completes executing. Finally, after the GPU-launched kernel 435-1 finishes executing, the CPU-launched kernel 235-1 complete executing and the parallel processing subsystem 112 executes the next CPU-launched kernel 235-2 within the stream.

Figure 5:
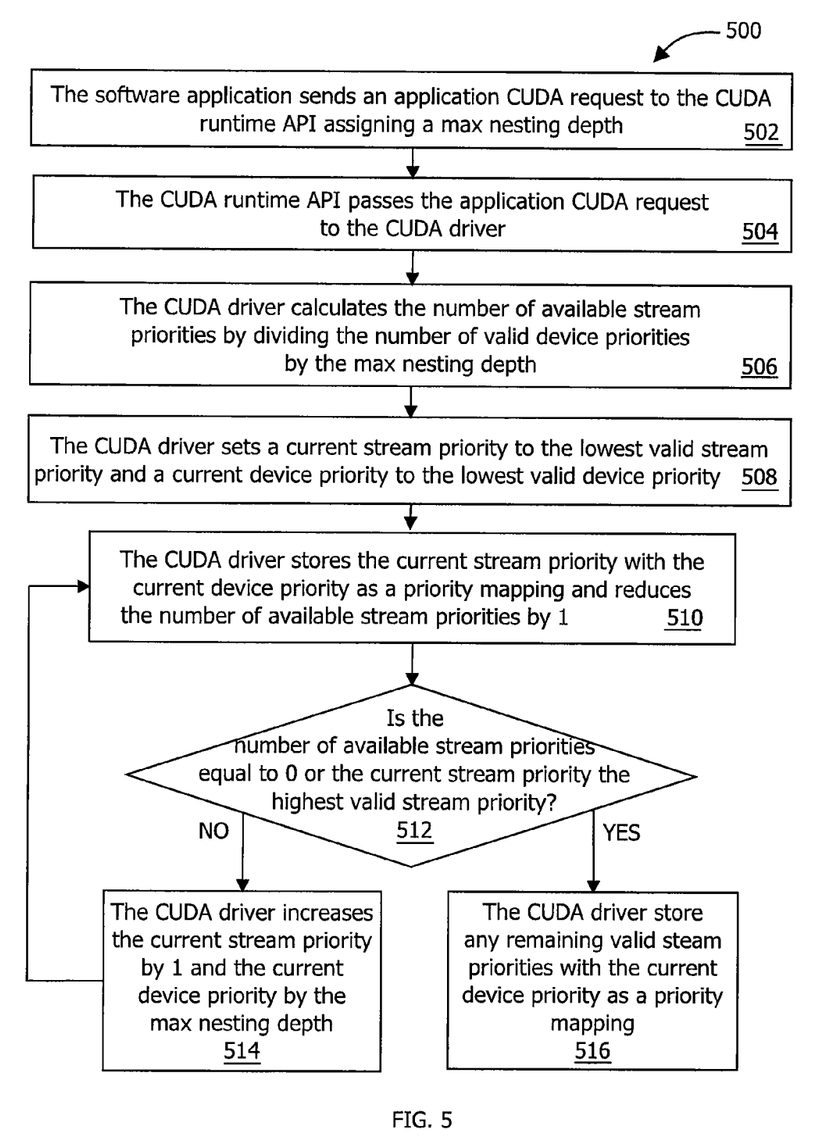
FIG. 5 is a flow diagram of method steps for determining the priorities available for different streams of work, according to one embodiment of the present invention.

FIG. 5 is a flow diagram of method steps for determining the priorities available for different streams of work, according to one embodiment of the present invention. Although the method steps are described with reference to the systems of FIGS. 1-4, persons skilled in the art will understand that any system configured to implement the method steps, in any order, falls within the scope of the present invention.

As shown, a method 500 begins at step 502, where the software application 125 sends an application CUDA request 205 to the CUDA runtime API 210 assigning a max nesting depth 224. At step 504, the CUDA runtime API 210 passes the application CUDA request 205 to the CUDA driver 220. At step 506, the CUDA driver 220 calculates a number of available stream priorities by dividing the number of valid device priorities 222 by the max nesting depth 224 and, subsequently, rounding down to the nearest integer. At step 508, the CUDA driver 220 sets a current stream priority to the lowest priority included in the valid stream priorities 212 and a current device priority to the lowest priority included in the valid device priorities 222. At step 510, the CUDA driver 220 includes (i.e., stores) the current stream priority with the current device priority in the priority mappings 226 and reduces the number of available stream priorities by 1.

At step 512, if the CUDA driver 220 determines that the number of available stream priorities is not equal to 0 or that the current stream priority is not equal to the highest priority included in the valid stream priorities 212, then the method 500 proceeds to step 514. At step 514, the CUDA driver 220 increases the current stream priority by 1 and increases the current device priority by the max nesting depth 224, Subsequently, the method 500 returns to step 510. Advantageously, by performing the mapping in this manner, the CUDA driver 220 reserves enough, and only enough, valid device priorities 222 for the parallel processing subsystem 112 to support dynamic parallelism to the max nesting depth 224.

The method 500 continues to execute steps 510 through 514, mapping valid stream priorities 212 to valid device priorities 222, until the CUDA driver 220 has mapped all of the valid stream priorities 212 or has performed a number of mappings equal to number of valid device priorities 222 available for prioritizing streams. If, at step 512, the CUDA driver 220 determines that the number of available stream priorities is equal to 0 or that the current stream priority is equal to the highest priority included in the valid stream priorities 212, then the method 500 proceeds to step 516.

At step 516, the CUDA driver 220 processes each unmapped priority included in the valid stream priorities 212 by including each of the unmapped valid stream priorities 212 with the current device priority in the priority mappings 226. For example, suppose that the number of valid device priorities 222 available for prioritizing steams were to be S less than the number of valid stream priorities 212. The CUDA driver 220 would map the (S+1) highest priorities included in the valid stream priorities 212 to the current device priority. In alternate embodiments, the CUDA driver 220 may be configured to perform the mapping in any technically feasible manner. For example, in some alternate embodiments, the CUDA driver could be configured to map the (S+1) lowest priorities included in the valid stream priorities to the lowest valid device priority.

Figure 6:
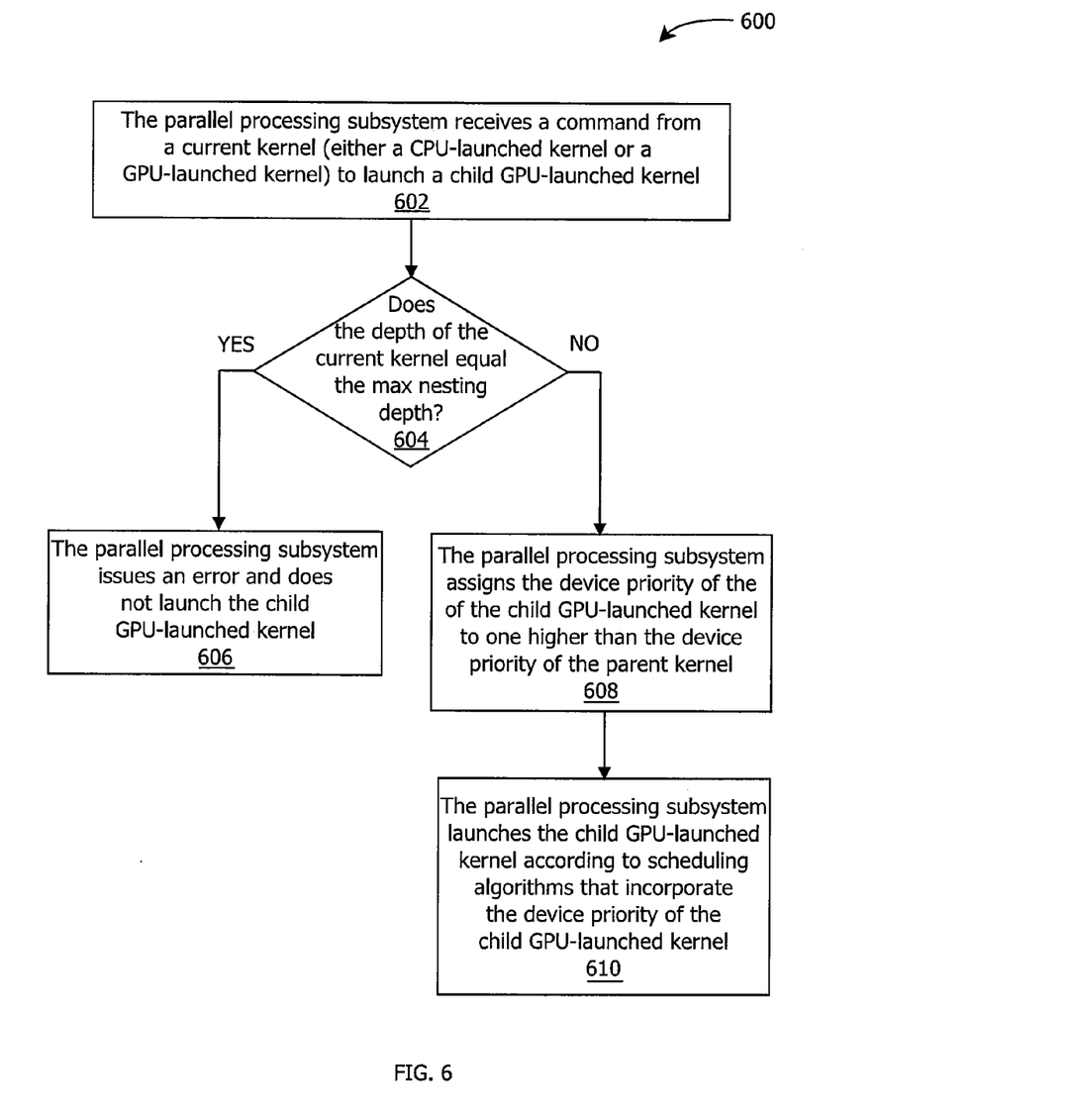
FIG. 6 is a flow diagram of method steps for assigning priorities to and launching different kernels, according to one embodiment of the present invention.

FIG. 6 is a flow diagram of method steps for assigning priorities to and launching different kernels, according to one embodiment of the present invention. Although the method steps are described with reference to the systems of FIGS. 1-4, persons skilled in the art will understand that any system configured to implement the method steps, in any order, falls within the scope of the present invention.

As shown, a method 600 begins at step 602, where the parallel processing subsystem 112 receives a command from a current kernel to launch a child GPU-launched kernel 435. The current kernel may be either a CPU-launched kernel 235 or a CPU-launched kernel 435. If, at step 604, the parallel processing subsystem 112 determines that the depth of the current kernel equals the max nesting depth 224, then the method 600 proceeds to step 606. The parallel processing system 112 may determine the depth of the current kernel in any technically feasible manner. At step 606, the parallel processing system 112 issues an error and does not launch the child CPU-launched kernel 435, and the method 600 terminates. In alternate embodiments, the parallel processing subsystem 112 may respond to the attempted launch of a kernel beyond the max nesting depth 224 in any technically feasible manner.

At step 604, if the parallel processing subsystem 112 determines that the depth of the current kernel does not equal the max nesting depth 224, then the method 600 proceeds to step 608. At step 608, the parallel processing subsystem 112 sets the device priority 450 included in the child CPU-launched kernel 435 to one higher than the device priority 450 included in the parent kernel. This prioritization ensures that the child CPU-launched kernel 435 receives parallel processing subsystem 112 resources in preference to the parent kernel. Advantageously, in contrast to prior-art techniques, the current invention enables a "parent" CPU-launched kernel 435 to include a device priority 450 that is not equal to the lowest priority included in the valid device priorities 222.

At step 610, the parallel processing subsystem 112 launches the child CPU-launched kernel 435 according to scheduling algorithms that incorporate the device priority 450 included in the child CPU-launched kernel 435. For example, suppose that the parallel processing subsystem 112 were to be executing a CPU-launched kernel 235 "Klow." Further, suppose that the CPU-launched kernel 235 "Klow" included a device priority 450 that were lower than the device priority included in the child GPU-launched 435. The parallel processing subsystem 112 could preempt the CPU-launched kernel 235 "Klow" to execute the child GPU-launched kernel 435.

It will be appreciated that the system and techniques described in FIGS. 1-6 are illustrative and that variations and modifications are possible. For example, in alternate embodiments, the CUDA software stack 150 (including the CUDA runtime API 210 and the CUDA driver 220), CUDA programming model, and CUDA language may be replaced with may be replaced with any set of software programs that expose and manage parallel processing subsystem functionality (e.g., OpenCL). Further the kernels may be replaced with any computational operation that may be launched on the parallel processing subsystem 112.

In sum, together a CUDA API and a CUDA driver enable software applications to effectively exploit both the prioritization and dynamic parallelism capabilities of advanced parallel processing subsystems. More specifically, the CUDA API allows software applications to assign a max nesting depth for dynamic parallelism. And the CUDA driver is configured to use the max nesting depth to determine the number of device priorities included in a set of valid device priorities supported by the parallel processing system that are available for prioritizing streams. The CUDA driver calculates the number of valid device priorities available for prioritizing streams by dividing the number of device priorities included in the set of valid device priorities by the max nesting depth and, subsequently, rounding down to the nearest integer. The CUDA driver then maps a set of valid stream priorities to the set of valid device priorities, ensuring that each valid device priority assigned to a valid stream priority is separated by the max nesting depth. In this fashion, for each valid stream priority, the CUDA driver reserves enough valid device priorities to support the nested launch of "child" work components to the max nesting depth.

Advantageously, the CUDA API and the CUDA driver enable software applications to influence the number of priority levels available for CUDA streams. Thus, the CUDA driver may more effectively prioritize work components submitted to parallel processing subsystems that support dynamic parallelism compared to prior-art, more restrictive approaches. For example, in order to reduce latency and increase throughput, the application developer may configure a software application with a lower max nesting depth, thereby freeing more priority levels for strategic prioritization of latency-sensitive work components. Consequently, the overall performance of the software application may be increased. Yet another advantage is that this approach enables the CUDA driver to productively direct the parallel processing subsystem to launch all work components included in a stream at the device priority associated with the stream. In particular, the CUDA driver may launch "parent" work components (i.e., work components that initiate dynamic parallelism) at the device priority associated with the stream. Thus, application developers may more comprehensively use priorities to increase the speed at which software applications execute.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of the present invention is determined by the claims that follow.

What is claimed is:

1. A method for mapping a plurality of stream priorities associated with a software application to a plurality of device priorities supported by a parallel processor, the method comprising:
   receiving a first request from the software application to associate a first stream with a first stream priority, wherein the first stream is for execution within the parallel processor;
   mapping the first stream priority to a first device priority;
   receiving a second request from the software application to associate a second stream with a second stream priority, wherein the second stream priority is higher in priority than the first stream priority, and the second stream also is for execution within the parallel processor; and
   mapping the second stream priority to a second device priority, wherein the second device priority is at least a maximum nesting depth higher in priority than the first device priority.

2. The method of claim 1, further comprising identifying the maximum nesting depth by:
   receiving a request from the software application specifying the maximum nesting depth;
   storing the maximum nesting depth in a memory resource; and
   subsequently accessing the memory resource to read the maximum nesting depth.

3. The method of claim 1, wherein the maximum nesting depth comprises a default maximum nesting depth.

4. The method of claim 1, further comprising:
   launching a first work component within the second stream for execution within the parallel processor at the second device priority.

5. The method of claim 4, wherein the first work component comprises a first function that is executable via a plurality of parallel threads.

6. The method of claim 4, wherein the first work component, when executing within the parallel processor, launches a second work component for execution within the parallel processor, and wherein the second work component comprises a child of the first work component.

7. The method of claim 6, wherein the second work component is associated with a third device priority that is higher in priority than the second device priority and higher in priority than the first device priority.

8. The method of claim 1, further comprising:
   receiving a third request from the software application to associate a third stream with a third stream priority, wherein the third stream priority is higher in priority than the second stream priority;
   identifying that the highest device priority supported by the parallel processor is separated from the second device priority by less than twice the maximum nesting depth; and
   mapping the third stream priority to the second device priority.

9. The method of claim 1, wherein the maximum nesting depth is less than a maximum number of execution levels supported by the parallel processor.

10. The method of claim 1, wherein the maximum nesting depth is equal to a maximum number of execution levels supported by the parallel processor.

11. A non-transitory computer-readable storage medium including instructions that, when executed by a processor, cause the processor to map a plurality of stream priorities associated with a software application to a plurality of device priorities supported by a parallel processor subsystem, by performing the steps of:
    receiving a first request from the software application to associate a first stream with a first stream priority, wherein the first stream is for execution within the parallel processor;
    mapping the first stream priority to a first device priority;
    receiving a second request from the software application to associate a second stream with a second stream priority, wherein the second stream priority is higher in priority than the first stream priority, and the second stream also is for execution within the parallel processor; and
    mapping the second stream priority to a second device priority, wherein the second device priority is at least a maximum nesting depth higher in priority than the first device priority.

12. The non-transitory computer-readable storage medium of claim 11, further comprising identifying the maximum nesting depth by:
    receiving a request from the software application specifying the maximum nesting depth;
    storing the maximum nesting depth in a memory resource; and
    subsequently accessing the memory resource to read the maximum nesting depth.

13. The non-transitory computer-readable storage medium of claim 11, further comprising launching a first work component within the second stream for execution within the parallel processor at the second device priority.

14. The non-transitory computer-readable storage medium of claim 13, wherein the first work component comprises a first function that is executable via a plurality of parallel threads.

15. The non-transitory computer-readable storage medium of claim 13, wherein the first work component, when executing within the parallel processor, launches a second work component for execution within the parallel processor, and wherein the second work component comprises a child of the first work component.

16. The non-transitory computer-readable medium of claim 15, wherein the second work component is associated with a third device priority that is higher in priority than the second device priority and higher in priority than the first device priority.

17. The non-transitory computer-readable storage medium of claim 11, further comprising:
    receiving a third request from the software application to associate a third stream with a third stream priority, wherein the third stream priority is higher in priority than the second stream priority;
    identifying that the highest device priority supported by the parallel processor is separated from the second device priority by less than twice the maximum nesting depth; and
    mapping the third stream priority to the second device priority.

18. The non-transitory computer-readable storage medium of claim 11, wherein the maximum nesting depth is less than a maximum number of execution levels supported by the parallel processor.

19. The non-transitory computer-readable storage medium of claim 11, wherein the maximum nesting depth is equal to a maximum number of execution levels supported by the parallel processor.

20. A system configured to map a plurality of stream priorities associated with a software application to a plurality of device priorities supported by a parallel processor, the system comprising:
  a memory that includes a driver program; and
  a processor that, when executing the driver program, is configured to:
    identify a maximum nesting depth that limits the number of nesting levels associated with child kernels that are launched by other kernels executing on the parallel processor;
    map a first stream priority associated with a first stream of work from the software application to a first device priority; and
    map a second stream priority associated with a second stream of work from the software application to a second device priority, wherein the second device priority is at least the maximum nesting depth higher in priority than the first device priority.

21. The system of claim 20, wherein the maximum nesting depth is based on a maximum number of execution levels supported by the parallel processing subsystem.

22. The system of claim 19, wherein the processor, when executing the driver program, is further configured to launch a first work component within the second stream of work for execution within parallel processor at the second device priority.

23. The system of claim 22, wherein the first work component, when executing within the parallel processor, launches second work component for execution within the parallel processor, and wherein the second work component comprises a child of the first work component.

24. The system of claim 23, wherein the second work component is associated with a third device priority that is higher in priority than the second device priority and higher in priority than the first device priority.

* * * * *

UNITED STATES PATENT AND TRADEMARK OFFICE
CERTIFICATE OF CORRECTION

PATENT NO. : 9,575,760 B2  Page 1 of 1
APPLICATION NO. : 13/897123
DATED : February 21, 2017
INVENTOR(S) : Vivek Kini and Christopher Lamb It is certified that error appears in the above-identified patent and that said Letters Patent is hereby corrected as shown below:

In the Claims

Column 16, Claim 11, Lines 11-12, please delete "subsystem";

Column 18, Claim 22, Line 9, please delete "19" and insert --20--.

Signed and Sealed this
Fourth Day of July, 2017

Joseph Matal
*Performing the Functions and Duties of the*
*Under Secretary of Commerce for Intellectual Property and*
*Director of the United States Patent and Trademark Office*